March 31, 1970    G. J. TAUBERT ETAL    3,503,853
MULTI-STAGE FLASH EVAPORATION PLANT
Filed Nov. 29, 1966    3 Sheets-Sheet 1

United States Patent Office 3,503,853
Patented Mar. 31, 1970

3,503,853
MULTI-STAGE FLASH EVAPORATION PLANT
Günter J. Taubert, Hermannsburg 32, Bremen-Huchting, Germany; and Hermann Rumphorst, Hegemannstrasse 2; and Klaus O. Wangnick, Hohentorsheerstrasse 120/124, both of Bremen, Germany
Filed Nov. 29, 1966, Ser. No. 597,749
Int. Cl. B01d 1/26
U.S. Cl. 202—173                                9 Claims

ABSTRACT OF THE DISCLOSURE

A multi-stage, flash-off evaporator arranged as a cylindrical column having a vertical core of successive condensation chambers and annularly arranged thereabout a vertical series of vapor or flash-off chambers. Sea water passes downwardly vertically through stages during evaporation through holes in the vapor chambers of such dimension as to seal one chamber from the other from passage of vapor by the downward flow of liquid. Condenser tubes extend through the separating walls of the condensation chambers with annular slots intermediate the tubes and separating walls through which at least a part of the distillate passes.

---

The present invention is concerned with a multistage flash evaporation plant which is especially suitable for the evaporation of large amounts of sea water or of brackish water.

With the increase in the number of stages in multistage evaporation plant, there is obtained an ever smaller temperature and pressure drop from stage to stage which involves problems not only of a constructional but also of an operational nature. In particular, it is difficult, with the small pressure drops available, to achieve an orderly flow through of water from stage to stage and thus to obtain conditions which are favorable from the point of view of heat economy.

The consideration which forms the basis of the present invention is that it ought to be possible to subject the flow through of water from stage to stage to the influence of gravity in order that the flow of water through the plant can automatically be ensured even in the case of small temperature and pressure drops. However, it is thereby essential that the water canals connecting the stages are constructed in such a manner that the vapor separation of the stages remain separate from one another.

This can be achieved, according to the present invention, in that the separating walls of the stages lying on top of one another are provided with holes or slots which are of such narrow dimensions that the vapor spaces of the adjacent stages are sealed off from one another by the liquid to be flashed off which flows down from stage to stage. It is thus achieved that the flow of water through the plant is automatically ensured by gravity alone and, consequently, the temperature drops between the individual stages can be reduced to almost any desired extent.

Expediently, the vapor condenser, such as is known for the horizontal mode of construction, is provided with condenser tubes running through from stage to stage, whereby, however, in contradistinction to the usual mode of construction, the condenser tubes pass freely through the separating walls of the condenser stages of the vapor condenser lying on top of one another and the slots thereby formed by the play between the condenser tubes and the separating walls serve as canals for the flow through of water. Not only constructional but also operational advantages are hereby achieved. Since the sealing off of the tube lead-throughs is brought about by the downwardly flowing water itself, it is no longer necessary, as was previously the case, to seal off the tubes by special sealing means, for example, by rolling in into the separating walls. From the operational point of view, there is thus obtained the advantage that the tubes can also freely expand and are not disturbed in their expansion movements by any connection with the separating walls.

In order to simplify the servicing and the construction of the plant, the condenser tubes can be constructed in such a manner that they do not continue over all of the condenser stages but rather are divided up into several lengths, each of which extends over a group of condenser stages, special water chambers thereby being provided between the groups for the transference from one group of condenser tubes to the next one.

An arrangement which is especially advantageous from a constructional and operational point of view is obtained when the evaporator is constructed as a vertical round construction, the central part of which is occupied by the multi-stage condensers, while the outer part forms the flash evaporator with its annular flashing off stages encompassing the condenser stages. The round construction can thereby consist of concrete or reinforced concrete. The holed bases and the continuous, tube-shaped separating wall between the flashing off and condenser part can also be made from concrete or reinforced concrete, while the separating walls and the tube end plates of the condenser expediently consist of metal.

The evaporation plant according to the present invention will now be explained in more detail, with reference to the accompanying drawings, in which.

Figure 1:
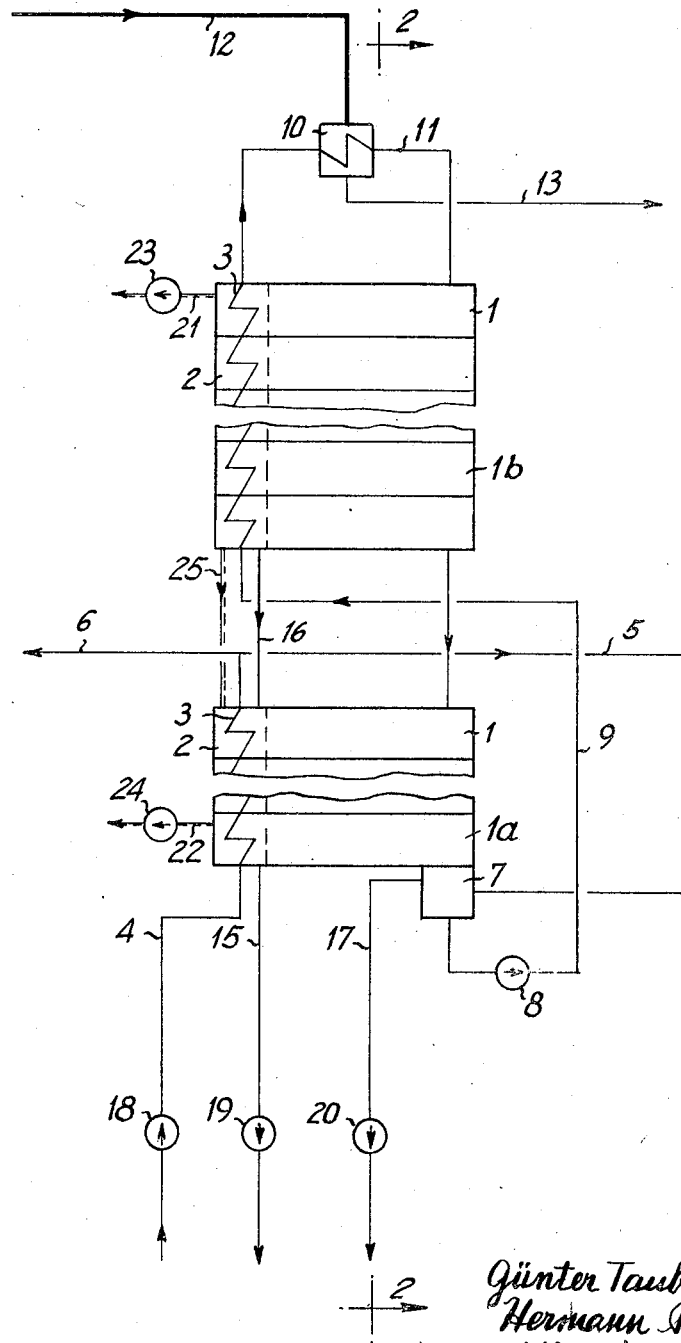
FIG. 1 shows the flow diagram of a multi-stage flash evaporator according to the present invention.

The evaporator illustrated in the accompanying drawings for the production of fresh water from sea water or brackish water works according to the principle of a multi-stage flash evaporator. In this evaporator, concentrated circulation water, for example, from sea water, after it has been heated to a temperature of, for example, 90° C., is evaporated in a series of successively connected flashing off chambers 1 by stepwise flashing off from, for example, 90° C. down to 30° C., and the vapor or vapors formed condensed in a corresponding number of chambers 2 of a vapor condenser with cooling tube system 3. As cooling medium for the vapor condenser, sea water is used in the lower pressure stages (which in the following, together with the associated flashing off stages, is designated as the flow through part 1a). This sea water is fed via a pipe 4 to the cooling tube system 3 of the lowest pressure stage of the vapor condenser and flows from the cooling tube system 3 of the uppermost stage of the flow through part 1a, partially via a pipe 5 to the circulation system of the evaporator, while most of the remaining part is lead off via a pipe 6. The pipe 5 opens into a water chamber 7 connected to the lowest flashing off stage, is mixed with the circulating water which collects there and which still has not been evaporated and, together with this, passed by a circulating pump 8 via a pipe 9 to the cooling tube system 3 of the lowest condenser stage of the vapor condenser (which, in the following, together with the associated flashing off stages, is designated as circulation part 1b). From the uppermost condenser stage, the heated circulation water flows via an end pre-heater 10 and a pipe 11 into the uppermost flashing off stage of the circulation part 1b.

Into the end pre-heater 10, there is passed in the additional amount of heat necessary for the whole process by means of superheated steam via a pipe 12 and the hot steam condensate is withdrawn through a pipe 13.

Figure 2:
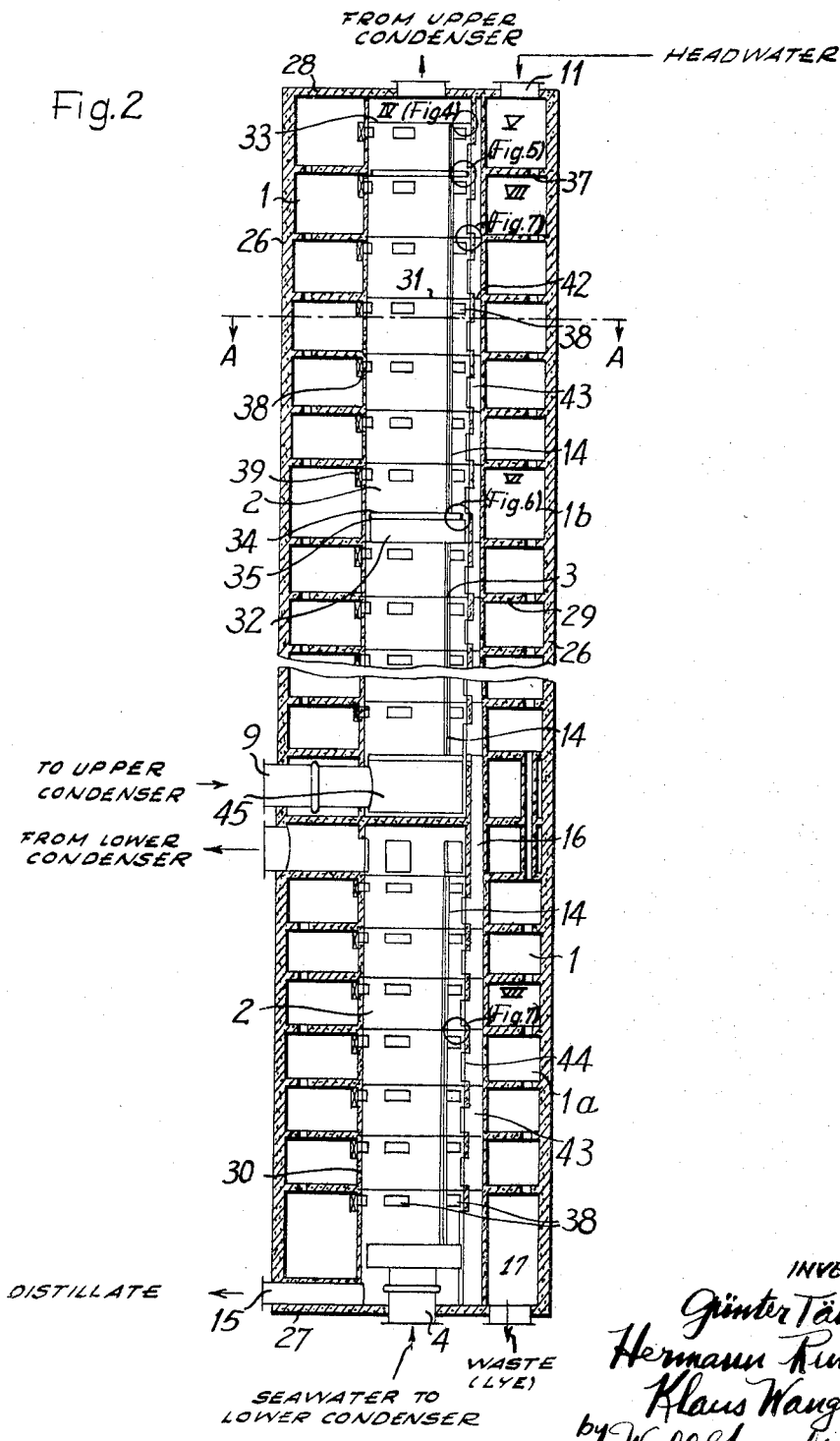
FIG. 2 shows, in axial cross-section, an embodiment of the flash evaporator according to FIG. 1.
Figure 3:
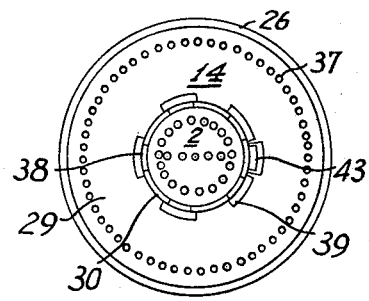
FIG. 3 shows a radial cross-section along line A—A of FIG. 2.

With each of the flashing off chambers 1, there is associated a chamber 2 of the vapor condenser lying at about the same height, which can be seen not only from the circulation diagram of FIG. 1 but also from the illustrated embodiment according to FIG. 2. The vapors formed in each flashing off chamber 1 pass, as is described below in more detail, via connecting openings 38, directly into the adjacent chamber 2 of the vapor condenser, while the rest of the circulation water is passed over into the following stage, i.e. the stage with the next lowest pressure.

The distillate deposited in the vapor condenser on cooling tubes 14 of the cooling tube system 3 also proceeds downwardly from stage to stage and is withdrawn from the lowest stage of the vapor condenser via a pipe 15. Through an intermediate pipe 16, the distillate is passed over from the lowest stage of the circulation part 1b into the uppermost stage of the flow through part 1a.

From the lowest stage of the flashing off evaporator or of the chamber 7, the lye is withdrawn via a pipe 17.

In pipes 4, 15 and 17, there are provided pumps 18, 19 and 20 for the sea water, distillate and lye, respectively. On the uppermost and the lowest stage of the vapor condenser, there are connected pipes 21 and 22, with pumps 23 and 24, respectively, for de-aeration. An intermediate pipe 25 serves for the transference of the air from the lowest stage of the circulation part 1b into the flow through part 1a.

The important parts of the plant according to FIG. 1, as illustrated in FIG. 2, are combined to form a vertical round construction, the central part of which is occupied by the multi-stage vapor condenser with its chambers 2, while in the outer part there is housed the flashing off evaporator with its flashing off chambers 1 annularly encompassing the condenser chambers 2.

The round construction consists of concrete or reinforced concrete, i.e. not only its outer mantle 26, as well as its base 27 and its cover 28, but also the horizontal ring-shaped separating walls 29 between the flashing off stages and the continuous tube-shaped separating wall 30 between the flashing off and the central condenser part. The horizontal, circular-shaped separating walls 31 between the condenser stages consist of metal plates.

Figure 4:
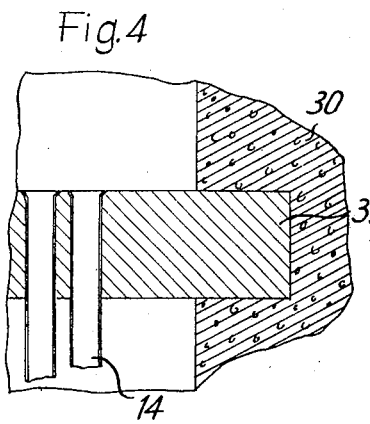
FIG. 4 is an enlarged view of the part IV of FIG. 2.
Figure 5:
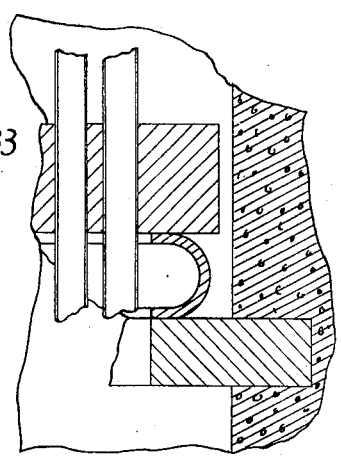
FIG. 5 is an enlarged view of the part V of FIG. 2.
Figure 6:
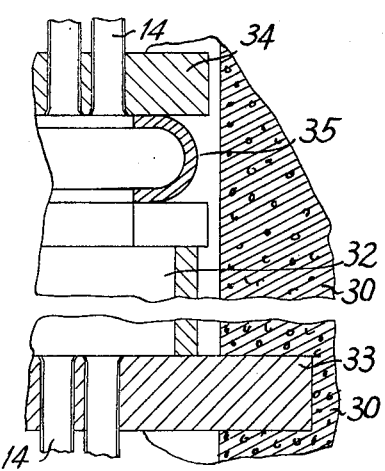
FIG. 6 is an enlarged view of the part VI of FIG. 2.

The tube system of the vapor condenser part is constructed from straight, parallel tubes 14, the ends of which lie, as is usual, in tube plates. The cooling tubes 14 of the condenser do not run through the whole of the condenser stages but are divided up into several lengths, each of which extends over a group of condenser stages. Between these groups, there are provided special water chambers 32 for transmission from one condenser group to the next one. The upper tube plates 33 are each firmly connected with the tube-shaped separating wall 30 (FIG. 4), while the lower tube plates 34 are connected, via an expansion element 35, with the tube-shaped separating wall 30 (FIG. 6).

Not only in the condenser part but also in the flashing off part, the water flow from one stage to the next takes place through openings in the separating walls. In the separating walls 29 of the flashing off chambers 1, there is provided a ring of holes 37. These holes 37 are of such small dimensions that the vapor chambers of the adjacent stages are sealed off from one another by the liquid to be flashed off flowing downwardly from stage to stage so that none of the only small amounts of vapor can get into the next stage directly. The transmission of the vapors from the flashing off chambers 1 into the adjacent chambers of the vapor condenser takes place via openings 38 in the separating wall in front of which, in the flashing off chambers 1, there are also connected water separators 39.

The water flow-through holes in the separating walls 31 of the vapor condenser are preponderantly formed by the annular slots 40 which are formed between the continuous tubes 14 and their continuous borings in the separating walls 31. In addition to these annular slots 40, there is a further conduction of the distillate from one condenser stage to the next via holes 41 which lie in the extensions 42 of the separating plates 31 within one of the stacks 43 extending over the whole height of the construction which is connected with the condenser chambers 2 via openings 44.

The circulation pipe 9 is connected via a water chamber 45 to the pipe system of the lowest stage of the circulation part 1b.

Not only in the flashing off chambers 1 but also in the chambers 2 of the vapor condenser, there is formed a water level over the separating walls 29, 31 which ensures a satisfactory vapor separation of the stages and even in the case of temporary considerably reduced amounts of water, only comparatively small amounts of vapor can get into the next lowest stage.

Figure 7:
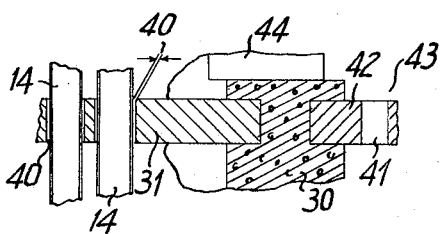
FIG. 7 is an enlarged view of the part VII of FIG. 2.

The stages are constructed in such a manner that approximately the same drop in temperature is obtained from stage to stage. The ring slots 40 are variously constructed in conformity with the varying pressure drops thereby produced in the various stages so that, in spite of the varying drop of pressure, the separation of the vapor chambers by the downwardly flowing distillate is ensured, as can be seen, in particular, in FIG. 7.

In the case of larger pressure differences, the tubes 14 can possibly also be rolled into one or more separating walls 31 in order thereby to ensure a complete separation between the individual stages when the ring slot thickness necessary therefor can technically only be produced with difficulty. These separating walls 31 are then, in the same way as the lower tube plates 34, connected via an expansion element 35 with the separating wall 31. If there are different coefficients of heat transmission in the individual stages—the rolling in of pipes in the intermediate walls 31 can, for example, lead to a higher coefficient of heat transmission in the stage immediately below—then the condenser stages in question are constructed correspondingly higher or lower in conformity with the prevailing coefficient of heat transmission so that, as is desired, approximately the same degree of temperature drop is obtained for all stages.

What we claim is:

1. Multi-stage flash off evaporator, for the evaporation of very large amounts of sea water or of brackish water, said evaporator comprising a plurality of stages comprising upper and lower groups, each stage having a vapor chamber and a condensation chamber, said stages being separated by horizontally extending walls lying one above the other and having holes which are of such small dimensions that said vapor chambers of adjacent stages are adapted to be sealed from one another by water to be flashed off flowing downwardly by gravity from stage to stage, condenser tubes extending vertically and running continuously from stage to stage through said separating walls of said condensation chambers, means for circulating sea water feed through the condenser tubes in said lower group of stages, means for mixing a portion of said circulating sea water with water collected from the lowermost stage and passing a portion of the mixture through condenser tubes in the upper group of stages, heating means connected to the condenser tubes in the uppermost stage for preheating the feed before it is introduced into the uppermost stage, and slots formed between said condensation tubes and separating walls serving as passages for the flow through of water distillate.

2. Evaporator according to claim 1 wherein only a part of the distillate flows through said slots between said tubes and separating wall, and means for drawing off the balance of said distillate.

3. Evaporator according to claim 2, wherein, said slots have different dimensions, whereby a continuous flow of distillate may be maintained and the vapor chambers isolated by downwardly flowing water with varying pressure drops in the different stages.

4. Evaporator according to 3, wherein the individual condensation chambers are constructed with differing height in conformity with the varying coefficients of heat transmission whereby in spite of different coefficients of heat transmission, approximately equally great temperature drops are obtained in all stages.

5. Evaporator according to claim 4, wherein the condenser tubes are divided up into several lengths, each of which extends over a group of stages, and a water chamber between each of said groups interconnecting said tubes for transmission of fluid with said tubes from one group of the stages to the next.

6. Evaporator according to claim 5, including tube plates with said condenser tubes each suspended from a tube plate above, said tube plate above said tubes is firmly connected with the housing of the evaporator, and means securing a tube plate below each tube secured to the housing by an expansion element.

7. Evaporator according to claim 5, having separating walls connected to said continuous condenser tubes and expansion means connecting said separating walls to the housing of the condensation chamber.

8. Evaporator according to claim 6 wherein said evaporator has a vertical round configuration, the core of which comprises said condensation chambers in vertical alignment, and the outer part of which comprises said vapor chamber.

9. Evaporator according to claim 8, wherein the round configuration consists of concrete or reinforced concrete.

References Cited

UNITED STATES PATENTS

| | | | |
|---|---|---|---|
| 1,069,829 | 8/1913 | Thoens et al. | |
| 1,105,443 | 7/1914 | Lougher | 159—18 |
| 3,298,932 | 1/1967 | Bauer | 203—11 |
| 3,303,106 | 2/1967 | Standiford | 203—27 |
| 3,304,242 | 2/1967 | Lockman | 202—173 |
| 3,356,591 | 12/1967 | Peterson | 203—26 X |
| 3,329,583 | 7/1967 | Othmer | 203—10 X |
| 3,344,041 | 9/1967 | Wulfson | 203—11 |
| 3,399,118 | 8/1968 | Williamson | 202—173 |

FOREIGN PATENTS 520,064    4/1940    Great Britain.

OTHER REFERENCES

Chemical Engineering, vol. 72, No. 7 (Aug. 16, 1965), p. 55.

NORMAN YUDKOFF, Primary Examiner

F. E. DRUMMOND, Assistant Examiner

U.S. Cl. X.R.

202—174; 203—11, 88